July 4, 1950  M. E. SNODDY  2,514,346
POP-UP SPRAY HEAD
Filed Sept. 9, 1946
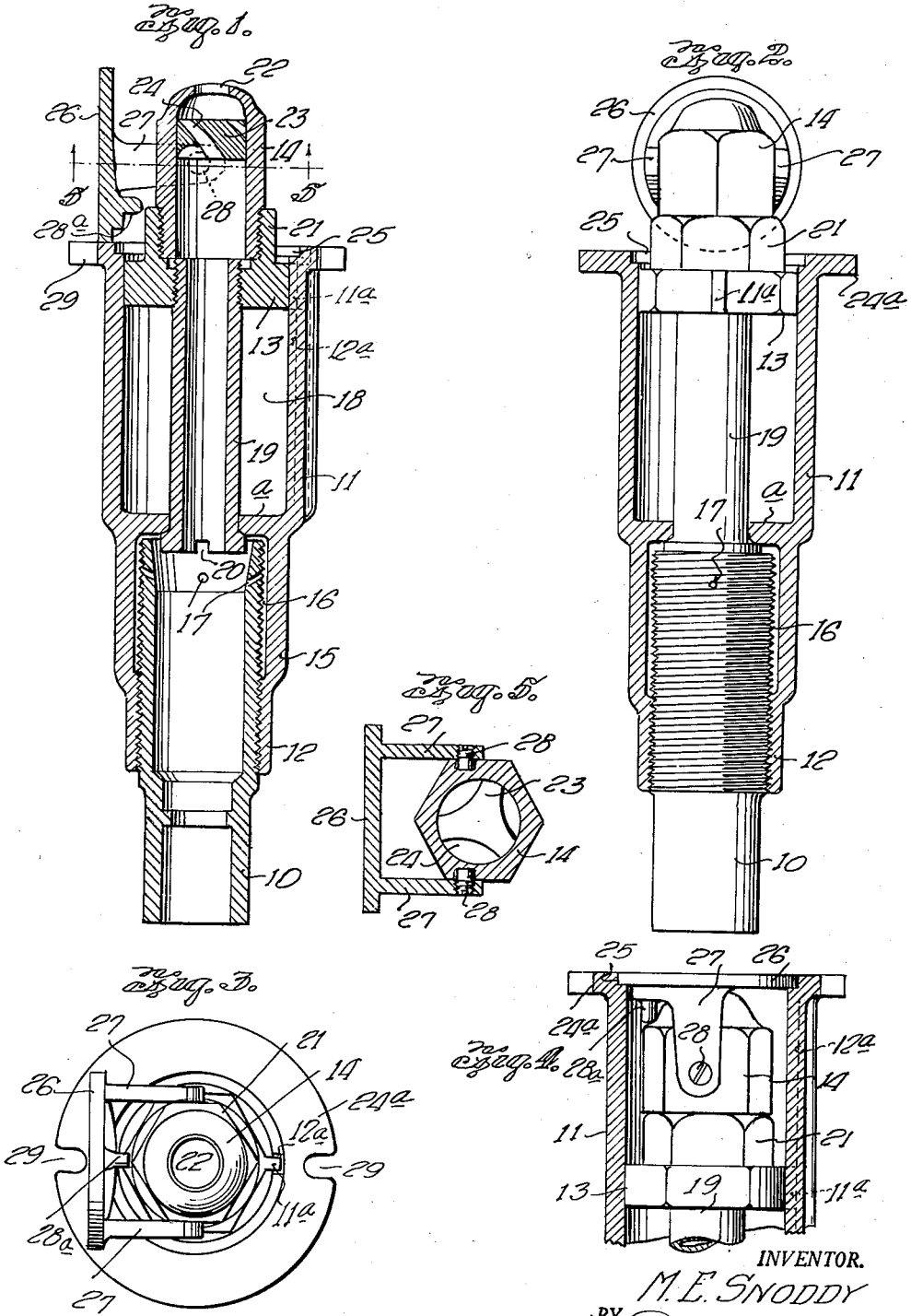
INVENTOR.
M. E. SNODDY
BY
ATTORNEY Patented July 4, 1950

2,514,346

UNITED STATES PATENT OFFICE 2,514,346

POP-UP SPRAY HEAD

Max E. Snoddy, Dallas, Tex., assignor to Texas Lawn Sprinkler Company, Inc., Dallas, Tex.

Application September 9, 1946, Serial No. 695,613

2 Claims. (Cl. 299—61)

This invention relates to lawn sprinkling systems and it has particular reference to a spray nozzle for such a system.

The principal object of the invention is to provide a spray head for a lawn sprinkling system which, among others of analogous construction, is adapted to be submerged in the soil in such manner that the top thereof will be more or less flush with the ground in order that it will offer no obstruction to objects moved across a lawn, such as lawn mowers and the like, said spray head being equipped with a nozzle, which, by virtue of a vertically reciprocable stem, is capable of being concealed within the spray head subject to water pressure imposed thereon from below, which causes the nozzle to emerge from the spray head to distribute water over a wide area until the water pressure is relieved, whereupon the nozzle, under the influence of gravity returns to its concealed position in the spray head.

Another object of the invention is to provide a cover hinged to the nozzle and, when the nozzle is inoperatively disposed in its receptacle in the spray head, the cover is adapted to overlie said receptacle, to prevent dirt and other matter from entering the same which would interfere with free and unrestricted movement of the stem which serves as a guide and feeder for the nozzle. Provision is also made to insure proper displacement of the cover when the nozzle, influenced by pressure of water, is projected from the top of the spray head.

Another object of the invention is to provide means for adjusting the height of spray head in relation to the grade from the surface of the ground subsequent to installation without disturbing the turf. In certain sections of the country and particularly in the south, it is customary to fertilize lawns by adding top soil. Lawn levels in this manner are subject to change each season top soil is added. The spray head will not perform properly below grade as the overlying grass distorts the spray and thereby prevents it from overlapping with adjoining spray heads, resulting in dry spots. The present invention provides a convenient and expedient means for raising the spray head to grade, and compensates for any variation in the grade for insuring an overall, predetermined increase in height after the spray head is once set to existing grade at the time of installation. Moreover, in cases where the present invention is used in frigid climates, position is made for draining water entrapped in the body of the spray head to allow for expansion of frozen water in this spray to prevent bursting of the passages.

With the foregoing and other objects in view, the invention has particular reference to certain features of accomplishment which will become apparent as the description proceeds taken in connection with the accompanying drawings, wherein:

Figure 1 is a vertical sectional view of the invention.

Figure 2 is a similar view but rotated 90° from the showing in Figure 1.

Figure 3 is a plan view of Figure 1.

Figure 4 is a fragmentary view in vertical section, showing the cover for the spray head, in closed position, and Figure 5 is a transverse sectional view taken on line 5—5 on Figure 1.

Continuing with a more detailed description of the drawing, reference numeral 10 denotes a riser which has male or female sweat connections with a submerged fitting on the supply line of the lawn sprinkling system. The riser 10 is threaded at its upper end to be received by the lower end of the casting or housing 11, the threaded lower end being identified by the reference character 12.

It will be observed that the spray head housing is progressively increased in diameter from the lower threaded section 12 to the upper section which latter is elongated to accommodate the vertically reciprocable mounting 13 of the spray nozzle 14, which latter is held against other than vertical displacement by virtue of a key 11a slidable in a groove 12a in the wall of the housing 11. The intermediate section 15 of the housing 11 accommodates the upper end of the threaded upper portion of the riser 10, providing an annular space 16, from which entrapped water is drained through orifices or ports 17, spaced annularly about the upper end of a riser 10. In cold climate such water as may be entrapped in the annular space 16, is permitted to drain through the orifices or ports 17 back into the supply line and therefore does not present a hazard caused by the freezing of water in this annular space which would possibly result in expansion and consequent fracture of the shell or housing 11 of the spray head. Moreover, unlike conventional spray devices designed for similar purposes, which removal of soil for height adjustment, the threaded riser 10 affords an adjustment for the spray head in relation to grade from the surface of the ground after installation without disturbing the turf.

The upper portion of the shell or housing 11 is enlarged beyond the lower or intermediate section 12 and 15 respectively in order to accommodate the mounting 13 of the nozzle 14. When water pressure is non-existant, the mounting 13 will rest upon the shoulder $a$ in the cavity 18 provided therefor in the spray head housing 11.

Threaded into the nozzle mounting 13 from the bottom is a hollow stem 19 which latter has a screw driver slot 20 in its lower end to facilitate its securement to the mounting 13. The mounting 13 has an internally threaded boss 21 on its upper end which is hexagonal to receive a suitable wrench or other tool, and into which is threaded in the lower end of the nozzle 14, the latter having an aperture 22 in its top, through which water passing upwardly through the riser 10, stem 19 and the nozzle 14 may emerge, to be swirled and spread over a wide range by means of an insert 23 which is press fitted or otherwise secured to the nozzle 14 and is provided with spiral grooves 24 in its perimeter through which water is constrained to pass before emerging from the aperture 22 of the nozzle 14 and by which the water is caused to separate into individual streams taking a spiral course as they pass from the nozzle 14.

The upper end of the housing 11 of the spray head is flanged at 24a which flange has a circular recess 25 therein to receive a circular cover 26. This cover is provided with parallel legs 27 which are perpendicular to the undersurface of the said cover and are pivoted by means of countersunk screws 28 to the nozzle 14, their pivotal points being in offset relationship to the vertical or longitudinal axis of the said nozzle 14.

By offsetting the pivotal point of the screws 28 in relation to the nozzle 14, there is always the assurance that the cover 26, which is displaced by upward movement of the nozzle 14 under pressure of water, will move to one side as exemplified in Figures 1 and 2. The cover 26 has formed on its undersurface a semi-circular flange on which, in turn, is molded a stop 28a. When the cover is closed, the perimeter thereof rests in the annular recess 25 of the head. The purpose of the stop 28a is to prevent the hinged cover 26 from tilting forward beyond the center line. This stop, combined with the fact that the cover is pivoted on the center, assures positive movement of the cover away from the nozzle while in action. When the spray nozzle first goes into action, water leaving the nozzle orifice is discharged against the side legs of the cover as well as fore and aft. It is the force of this water against the side legs held in an off-center position by the stop that assures movement of the cover to one side. Except for this stop 28a, the force of water quite often tilts the cover in a stalled position over the nozzle opening with water being ejected on either side of the legs in equal quantities.

The flange 24a of the housing 11 has diametrically opposed recesses 29 which are adapted to receive the lugs of a conventional spanner wrench for attaching and detaching the housing with respect to the riser 10.

It is clearly apparent from the foregoing that the described features for height adjustment of the head, combined with the provision for insuring positive displacement of cover during operative periods of the spray head, contributes largely to the efficiency of the invention over concentrical spray heads unequipped with the flexible characteristics of adjustment and provision against stalling of the cover when the spray head is in operation.

Manifestly, the construction as shown and described is capable of some modification and such modification as may be construed to fall within the scope and meaning of the appended claims is also considered to be within the spirit and intent of the invention.

What is claimed is:

1. In a lawn sprinkler, a housing enclosing a spray nozzle and its mounting, said housing having an interiorly threaded lower end and a chamber in its upper end, the spray nozzle mounting being movable longitudinally in said chamber, a guide intermediate the ends of said housing for said nozzle mounting, a riser having connection with a fluid source whose upper end is threaded to receive the lower end of said housing and is apertured, said riser defining an annular chamber adjacent the lower end of said housing in which entrapped water finds outlet through said apertures in the upper end of said riser, a cover for the chamber of said housing, a pair of parallel legs on said cover pivoted to said spray nozzle in offset relation to its longitudinal axis, an annular recess in the upper end of said housing for receiving said cover when said nozzle is inoperatively disposed in the chamber of said housing, and a stop formed on and perpendicular to the undersurface of said cover for insuring predetermined displacement of said cover upon emergence of said nozzle on said housing under pressure of fluid through said riser.

2. In a lawn sprinkler system, a spray nozzle housing adapted to be submerged in the soil of a lawn and having in its upper portion a cylindrical chamber and enclosing a spray nozzle and a nozzle mounting for reciprocable displacement in said chamber, a riser in communication with a source of water below the surface of the soil and having an elongated, threaded and apertured upper section extending into the lower portion of said housing, said riser upper section defining adjacent the lower end of said housing an annular space from which water is drained through the apertures of said riser, a hollow guide member connected to the mounting of said nozzle and reciprocable in the chamber of said housing and in said riser, a cover, an annular recess in the upper end of said housing for said cover, a pair of parallel legs depending from the underside of said cover and hingedly connected to said nozzle in offset relationship with its longitudinal axis, said cover being movable into a plane in parallel relationship to the axis of said nozzle when the latter is projected from the chamber of said housing under pressure of water through said riser, and means formed on and perpendicular to the underside of said cover against which said nozzle is engaged to fully displace said cover when said nozzle becomes operative.

MAX E. SNODDY.

REFERENCES CITED

The following references are of record in the file of this patent:

UNITED STATES PATENTS

| Number | Name | Date |
|---|---|---|
| 143,978 | Graham | Oct. 28, 1873 |
| 1,185,565 | Williams | May 30, 1916 |
| 1,192,743 | Brooks | July 25, 1916 |
| 1,259,902 | Parker | Mar. 19, 1918 |
| 1,428,553 | Oakes | Sept. 12, 1922 |
| 1,837,575 | Munz | Dec. 22, 1931 |
| 1,863,919 | Brooks | June 21, 1932 |
| 1,865,906 | Harford | July 5, 1932 |
| 2,076,947 | Johanson | Apr. 13, 1937 |
| 2,128,552 | Rader et al. | Aug. 30, 1938 |
| 2,151,214 | Kramer | Mar. 21, 1939 |
| 2,221,878 | Nelson | Nov. 19, 1940 |